United States Patent [19]

Broer

[11] Patent Number: 4,760,863

[45] Date of Patent: Aug. 2, 1988

[54] PRESSURE VACUUM VALVE, MORE PARTICULARLY TO THE STORAGE TANKS FOR VOLATILE LIQUIDS

[76] Inventor: Peter C. Broer, 32 Bay Road, Mount Gambier, 5290, Australia

[21] Appl. No.: 22,092

[22] Filed: Mar. 5, 1987

[30] Foreign Application Priority Data

Jun. 16, 1986 [AU] Australia .............................. PH6425

[51] Int. Cl.$^4$ ............................................. F16K 24/00
[52] U.S. Cl. .................................. 137/493.8; 55/304;
55/385 C; 137/522; 137/588; 220/204;
417/155; 417/196
[58] Field of Search ................... 137/587, 493, 533.19,
137/493.8, 588, 522; 417/155, 197; 126/307 A;
220/204, 219, 85 VS, 85 VR, DIG. 6; 55/293,
301, 304, 385 C, 374

[56] References Cited

U.S. PATENT DOCUMENTS

| 315,522 | 4/1885 | Loveless | 417/155 |
|---|---|---|---|
| 664,298 | 12/1900 | Shupert | 417/155 |
| 770,043 | 9/1904 | Bode | 137/522 |
| 956,862 | 5/1910 | Meyer | 55/293 |
| 1,145,252 | 7/1915 | Matthews | 137/587 X |
| 1,480,155 | 1/1924 | Darling | 137/522 |
| 1,505,695 | 8/1924 | Boyd | 137/533.19 X |
| 1,918,807 | 7/1933 | Glab | 137/493.8 X |
| 2,021,351 | 11/1935 | Carson | 137/533.19 X |
| 2,164,880 | 7/1939 | Merkt | 417/155 |
| 2,228,595 | 5/1942 | Will | 417/155 |
| 3,221,730 | 12/1965 | Hughes et al. | 126/307 A |
| 3,719,032 | 3/1973 | Cash | 417/155 X |
| 4,266,568 | 5/1981 | Kuykendall | 137/493.8 |
| 4,385,912 | 5/1983 | Parrick et al. | 55/385 C X |

FOREIGN PATENT DOCUMENTS

| 629861 | 10/1961 | Canada | 137/493 |
|---|---|---|---|
| 1,109,027 | 1/1956 | France | 137/533.19 |
| 22390 | 10/1907 | United Kingdom | 417/155 |

Primary Examiner—Martin P. Schwadron
Assistant Examiner—Stephen M. Hepperle
Attorney, Agent, or Firm—Cushman, Darby & Cushman

[57] ABSTRACT

A pressure vacuum valve arrangment for the fitting to the vent pipe of a tank for the storage of volatile fuel comprises a first valve to open on increasing pressure of the tank to allow escape of air and vapors from the tank and a second valve adapted to open on decrease of pressure in the tank due to withdrawal of fuel to allow air to enter the tank. To the top is fitted a sleeve forming a venturi action to disperse the vapors into the atmosphere, and to the entry of the second valve is provided a bag filter to prevent dust entering the tank.

4 Claims, 2 Drawing Sheets

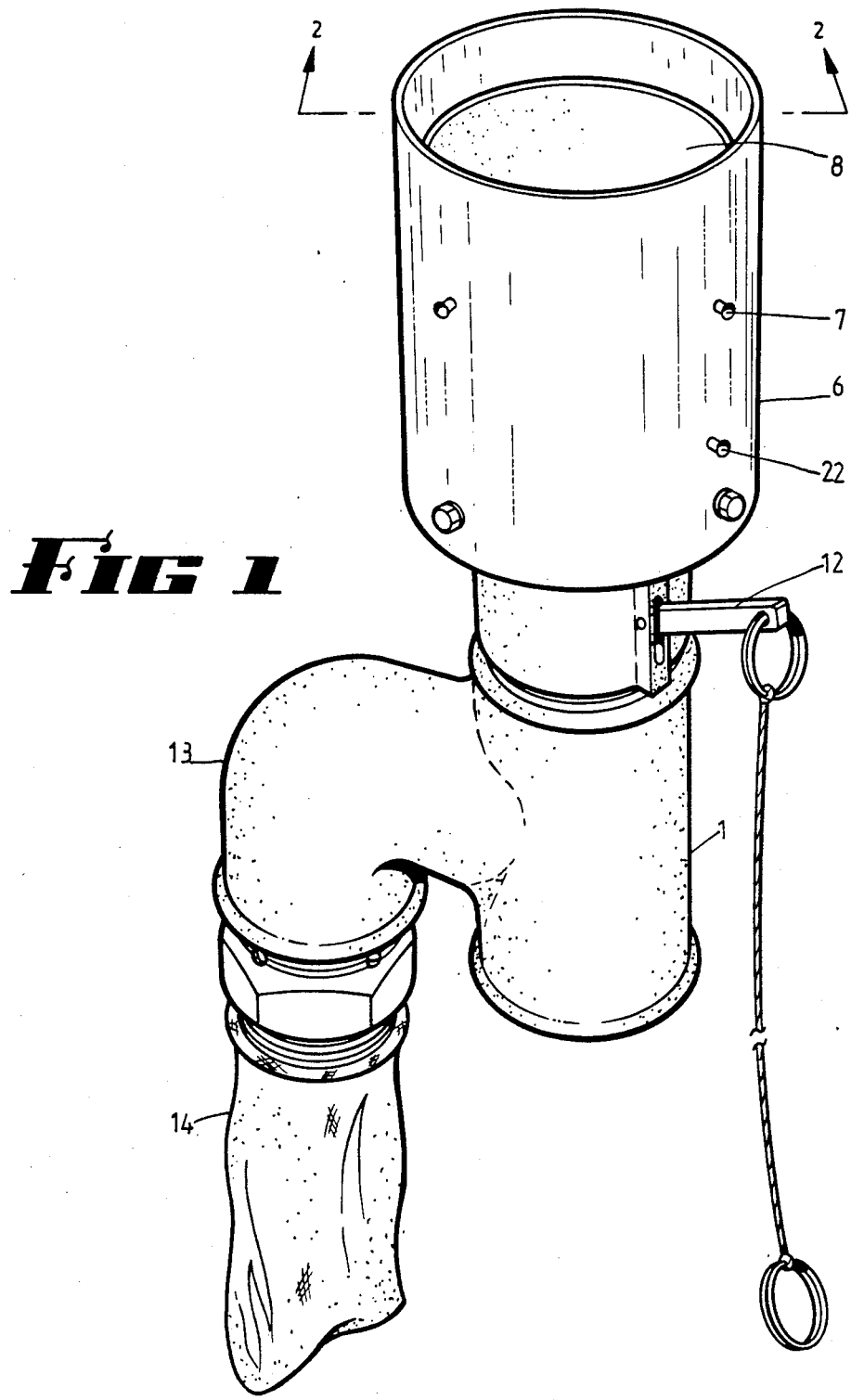

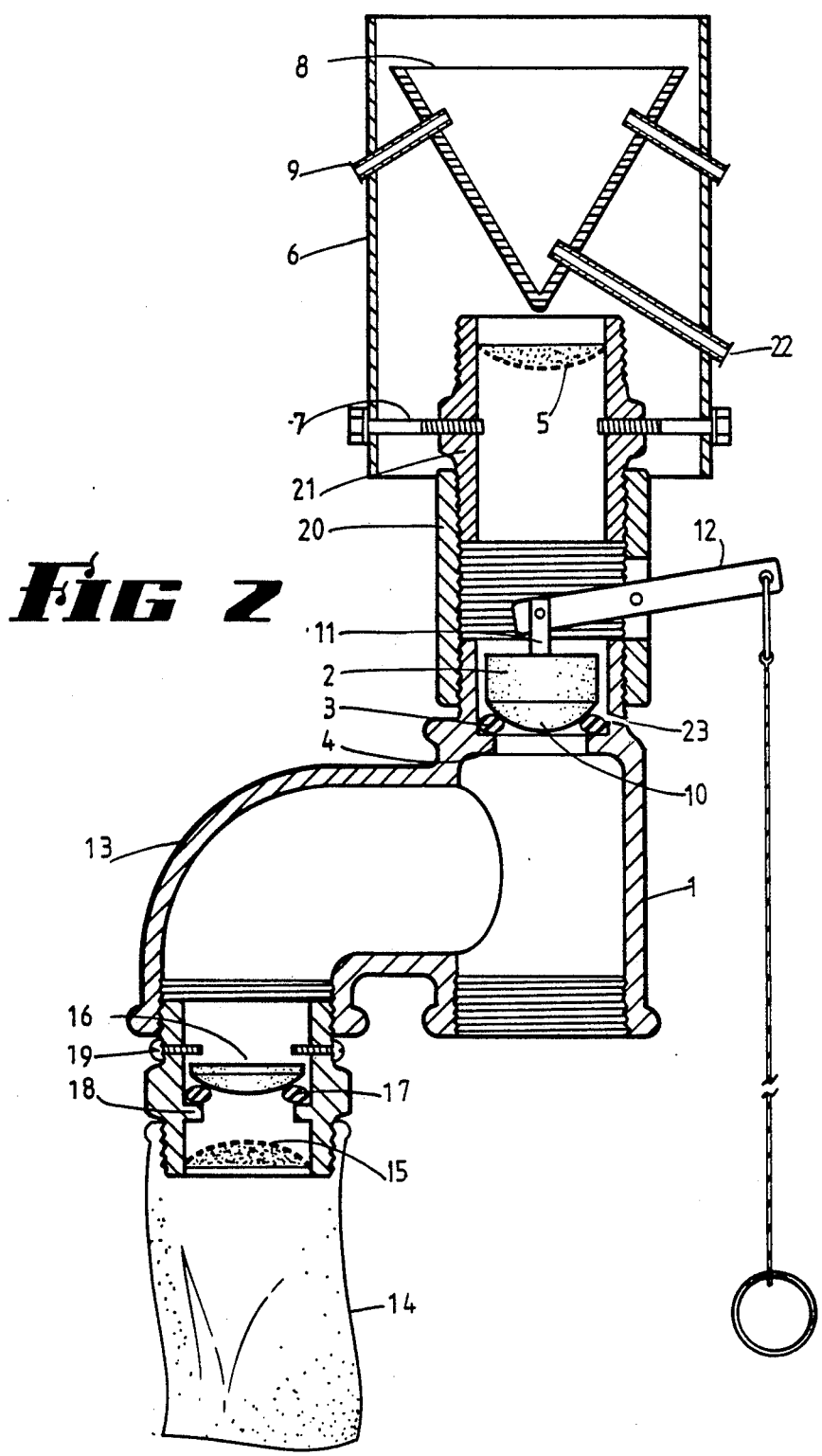

PRESSURE VACUUM VALVE, MORE PARTICULARLY TO THE STORAGE TANKS FOR VOLATILE LIQUIDS

BACKGROUND OF THE INVENTION

Petroleum products are relatively volatile, and due to the nature of these products, storage tanks and the like must be vented to atmosphere to prevent build-up of excessive pressures in the tanks and also to provide a venting means during the filling of the tanks. Various of the products contained in these fuels are very volatile, particularly butane which is one of the major energy producing hydro-carbons in these fuels.

It is well known that evaporation takes place even in underground storage tanks, and this evaportion can be between 0.5% and 2.0% of the fuel, the rate depending upon the location and siting of the tanks and vent pipe, the factors affecting the evaporation rate being primarily climatic conditions such as temperature and winds, and also elevation above sea level.

Many vent pipes are fitted with what is termed an up-draft vent cowl which directs the vapours upwardly away from the surrounding area, but these up-draft vent cowls particularly where the cowl is situated in a windy location assist in the drawing out of the lighter vapours from the vent pipe and thus increase the evaporation rte.

Australian Pat. No. 511,957 discloses one form of valve arrangement intended for fitting to the vent pipe of a storage tank, but this has the disadvantage of the fact that during filling of the tank a back pressure exists which must be overcome during the filling operation.

My earlier Patent Application No. 29444/84 discloses an arrangement whereby this back pressure is overcome. However, there is still the problem that the vapours are not dispersed into the atmosphere in an effective manner.

It is an object of this invention to provide a valve arrangement on the vent pipe to reduce the loss of the vapours through the vent pipe while still maintaining the safety requirements of preventing the build-up of vapour pressure within the storage tank and to allow the passage of make-up air into the storage tank during withdrawal of fuel from the storage tank.

It is a further object of the invention to provide a vent cowl which assists in the upward extraction of the vapours and disperses these into the atmosphere.

It is a still further object to provide a self-cleaning filter to filter the air entering the tank during the withdrawal of liquid from the tank.

BRIEF STATEMENT OF THE INVENTION

Thus there is provided according to the invention a pressure vacuum valve arrangement for the fitting to the vent pipe of a storage tank for volatile fuel, the valve arrangement comprising first valve means for preventing the free flow of vapours from the vent pipe into the atmosphere, but which valve is adapted to open under a desired pressure, the outlet of the valve having a surrounding sleeve whereby when the valve is open a venturi updraft effect lifts the vapours clear of the valve, the valve arrangement also including a second valve means which is normally closed but which is adapted to open during the withdrawal of the fuel from the storage tank to allow air to pass through the second valve means into the storage tank through the vent pipe.

BRIEF DESCRIPTION OF THE DRAWINGS

In order to more fully described the invention reference will now be made to the accompanying drawings in which:

FIG. 1 is a perspective view of the vent cowl, and

FIG. 2 is a cross sectional view of the vent.

DESCRIPTION OF THE PREFERRED EMBODIMENT

In the drawings the tube 1 is adapted to be fitted to the vent pipe of a storage tank, the tube 1 having fitted thereinto valve member 2 sealing on sealing rings 3 supported by a ring 4 in the tube. To the upper end of the tube there is fitted a cylindrical member 20 there being a screen 5 fitted into the upper end of a member 21 attached to member 20, and surrounding the upper end of the member 20 there is a sleeve 6. The sleeve 6 is supported from the member 21 by spaced rods 7, the sleeve 6 supporting in its interior an inverted conical shaped member 8. The member 8 is supported by hollow rods 9 opening into the interior of the conical member and sloping downwardly and passing through the wall of the sleeve 6. Thus, any rain or moisture which collects in the conical member 8 will drain out through the hollow rods 9 and also through drain 22. The sleeve 6 is concentric with and spaced from the walls of the member 20, and the conical shaped member forming a watering trap is spaced from the internal walls of member 20.

The valve 2 preferably is formed with a curved or hemispherical lower end 10 to ensure that it seats correctly at all times. The valve at its upper end is provided with a lug 11 to which is pivoted a lever 12 pivoted to the member 20, the end of the lever 12 having a cord or the like attached thereto so that this may be opened during filling of the underground tank to allow the rapid escape of the air and vapours therein and thus not providing any back pressure to the filling of the underground tank.

Below the valve 11 the tube 1 is provided with an elbow 13 to which at the bottom is attached a bag filter 14. In the interior of the elbow 13 there is a screen 15 and a valve 16 resting on seals 17 supported by a ring 18, the upward movement of the plate valve 16 being limited by pins 19 extending through the elbow 13.

A further water drain 23 is provided above the sealing ring 3 to drain any water which may collect around the sealing ring 3 due to condensation of water vapour or the weather conditions.

By the provision of the sleeve 6 and the V-shaped or conical member 8 fitted therein, any air-flow or the like passing over the top of the sleeve 6 produces an up-draft and a venturi effect between the conical member 8 and the sleeve 6. Thus any discharge of gases and vapours through the valve 2 have their velocity increased due to the venturi effect and the gases move upwardly away from the upper end of the sleeve 6 and are mixed and dispersed in the atmosphere.

This has the decided advantage of conventional cowls and the like, where it has been known that, as petrol vapours have a greater density than air, the petrol vapours merely come to the end of the vent tube or cowl and imediately flow downwardly over the vent tube and are not dispersed in the atmosphere.

As petrol is drawn from the underground tank due to the reduced pressure then the plate valve 16 will open allowing air to flow through the bag filter 14 into the tank. The bag filter is self-cleaning, for as it is of a relatively lightweight material it flaps and flexes in the wind and any dirt, dust or the like which accumulates on the surface is immediately caused to be removed from the bag due to the movement of the bag while flapping and flexing in any wind or breeze.

The meshes or grids 5 and 15 are flame-proof meshes for safety reasons.

Thus, the valve 2 is adapted to seal to prevent the escape of vapours through the vent pipe but is adapted to open under pressure conditions arising in the tank and vent pipe. The valve is of such a mass that it will at all times fall back on the seal and the diameter of the valve and seal is such that the pressure in the vent pipe, when this builds up either during filling or due to vapourization caused by a rise in temperature, will open to allow the escape of air and of vapours, this opening at a pressure of approximately 5.82 kilopascals and this then ensures that excessive pressures do not occur in the storage tank and thus falls within the safety requirements.

Valve 16 is adapted to open at a pressure of −0.5 kilopascals, the valve having a larger area so that the pressure across the valve plate will allow this to open at the lower pressure. Preferably this valve plate is also formed with a convex lower surface to ensure sealing at all times.

The valve 10 can be varied and modified depending upon the circumstances, and if the unit is to be used for smaller insulations, such as for farm storage tanks, the valve is varied in its constructions but while still maintaining the desired operation.

Although various forms of the invention have been described in some detail it is to be realised that the invention is not to be limited thereto but can include various modifications falling within the spirit and scope of the invention.

The claims defining the invention are as follows:

1. A pressure vacuum valve arrangement for the fitting to the vent pipe of a storage tank for volatile fuel, said valve arrangement comprising a housing for attachment to the vent pipe, said housing including a branch pipe opening into the interior of the housing and extending downwardly parallel to the vent pipe, a first valve means in said housing situated above said branch pipe and adapted to open on increase of pressure in the storage tank and vent pipe, a sleeve attached to the upper end of said housing, said sleeve being concentric to said housing and spaced from the side walls of the said housing, an inverted conical water trap in said sleeve, said water trap being spaced from the internal walls of said sleeve, second valve means in the lower end of said branch pipe, said second valve means being adapted to open on decrease of pressure within said tank and vent pipe, and a bag filter attached to the end of said branch pipe.

2. A pressure vacuum valve arrangement as defined in claim 1, further characterized in that drain means are provided from the inverted conical water trap to drain collected water, said drain means opening through the annular sleeve.

3. A pressure vacuum valve arrangement as defined in claim 1, characterized in that both valve means comprise a valve having a convex lower surface to seal on respective sealing rings, both valve means being closed by gravity.

4. A pressure vacuum valve arrangement as defined in claim 1, characterized in that said first valve means has means to manually open the valve, said means comprising a lever pivoted to said first valve means and the wall of said housing, said lever being connected to a pull cord whereby the said first valve means may be manually opened to reduce the back pressure during filling of the storage tank.

* * * * *